(12) United States Patent
Zimmerer

(10) Patent No.: US 9,676,138 B2
(45) Date of Patent: Jun. 13, 2017

(54) HOLDING DEVICE FOR PLASTIC PARISONS

(71) Applicant: KRONES AG, Neutraubling (DE)

(72) Inventor: Johann Zimmerer, Neutraubling (DE)

(73) Assignee: Krones, AG, Neutraubling (DE)

( * ) Notice: Subject to any disclaimer, the term of this patent is extended or adjusted under 35 U.S.C. 154(b) by 69 days.

(21) Appl. No.: 14/797,299

(22) Filed: Jul. 13, 2015

(65) Prior Publication Data

US 2016/0016350 A1   Jan. 21, 2016

(30) Foreign Application Priority Data

Jul. 15, 2014   (DE) .................. 20 2014 103 260

(51) Int. Cl.
| | | |
|---|---|---|
| *B29C 49/42* | (2006.01) | |
| *B29C 31/08* | (2006.01) | |
| *B23B 31/40* | (2006.01) | |
| *B29C 35/08* | (2006.01) | |
| *B29C 49/64* | (2006.01) | |

(Continued)

(52) U.S. Cl.
CPC ...... *B29C 49/4205* (2013.01); *B23B 31/4013* (2013.01); *B29C 31/08* (2013.01); *B29C 35/0805* (2013.01); *B29C 49/6418* (2013.01); *B29C 2035/0855* (2013.01); *B29K 2105/258* (2013.01); *B29K 2901/12* (2013.01); *B29L 2031/712* (2013.01)

(58) Field of Classification Search
CPC . B29C 49/4205; B29C 49/6418; B29C 31/08; B29C 2035/0855; B23B 31/4013
See application file for complete search history.

(56) References Cited

U.S. PATENT DOCUMENTS

| 4,572,355 A | 2/1986 | Hunter |
| 4,890,726 A * | 1/1990 | Wissmann ............ B29C 31/002 |
| | | 198/803.12 |

(Continued)

FOREIGN PATENT DOCUMENTS

| DE | 102007037400 | 2/2009 |
| DE | 102012106245 | 2/2014 |

(Continued)

OTHER PUBLICATIONS

German Search Report Dated Apr. 26, 2016, Issued in Corresponding German Patent Application No. 20 2014 103 260.6.

(Continued)

*Primary Examiner* — Robert B Davis
(74) *Attorney, Agent, or Firm* — Onello & Mello LLP

(57) ABSTRACT

A holding device for holding plastic containers and in particular plastic parisons with a holding section which can be introduced into a mouth of the plastic containers, wherein the holding section has at least one first holding element and one second holding element which are movable relative to one another and which in each case have a section which can be applied to an inner wall of the mouth. According to the invention an expansion body which supports the two holding elements at least intermittently is disposed between the holding elements, wherein a replaceable expansion element is disposed on this expansion body, wherein this expansion element is located at least in some sections between the expansion body and the holding elements.

18 Claims, 3 Drawing Sheets

(51) Int. Cl.
    *B29K 105/00*     (2006.01)
    *B29L 31/00*      (2006.01)

(56)            References Cited

U.S. PATENT DOCUMENTS

| | | | |
|---|---|---|---|
| 6,471,038 | B1 | 10/2002 | Yung |
| 6,761,556 | B1 * | 7/2004 | Pellegatta ........... B29C 49/4205 |
| | | | 198/803.12 |
| 8,567,589 | B2 | 10/2013 | Schonberger |
| 2003/0034231 | A1 | 2/2003 | Palisca |
| 2004/0047940 | A1 | 3/2004 | Zoppas |
| 2005/0092892 | A1 | 5/2005 | Goss |
| 2011/0120840 | A1 | 5/2011 | Schonberger |

FOREIGN PATENT DOCUMENTS

| | | |
|---|---|---|
| JP | 2005161576 | 6/2005 |
| WO | 2004046676 | 6/2004 |

OTHER PUBLICATIONS

Extended European Search Report dated Jan. 15, 2016, issued in corresponding European Patent Application No. 15176931.2.

* cited by examiner

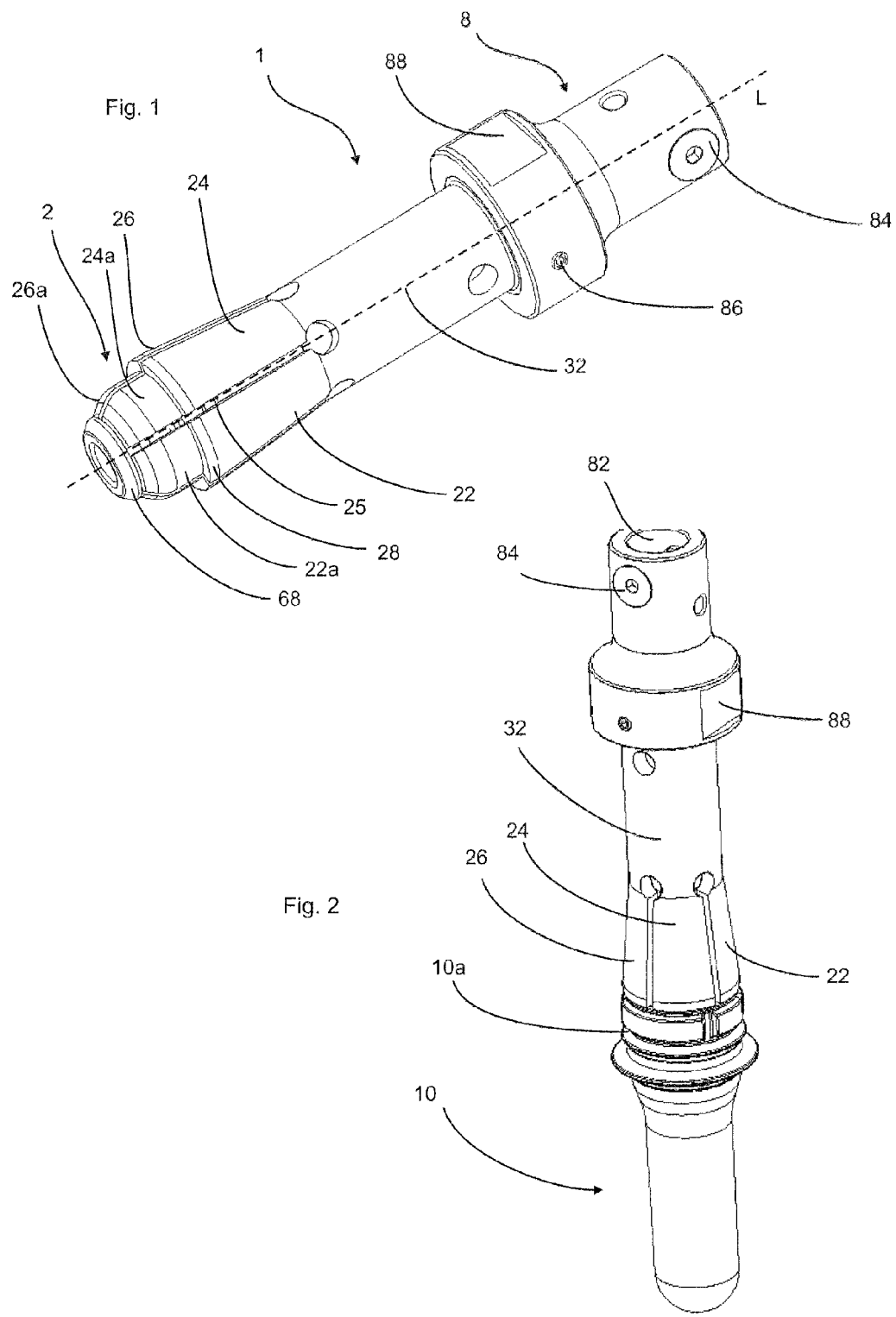

HOLDING DEVICE FOR PLASTIC PARISONS

RELATED APPLICATIONS

This application claims priority to German Patent Application Serial No. DE202014103260.6, filed Jul. 15, 2014, the content of which is incorporated herein by reference, in its entirety.

FIELD

The present invention relates to a holding device for plastic containers and in particular for plastic parisons. In the beverage manufacturing industry it is known that first of all plastic parisons are provided and heated and then these heated plastic parisons are transformed into plastic containers by means of transforming equipment, such as in particular stretch blow moulding machines. Different procedures are known for the heating operation.

DESCRIPTION OF DRAWINGS

FIG. 1 shows a perspective representation of a holding device according to the invention;
FIG. 2 shows the holding device according to FIG. 1 with a plastic parison disposed thereon.

DETAILED DESCRIPTION

Figure 3:
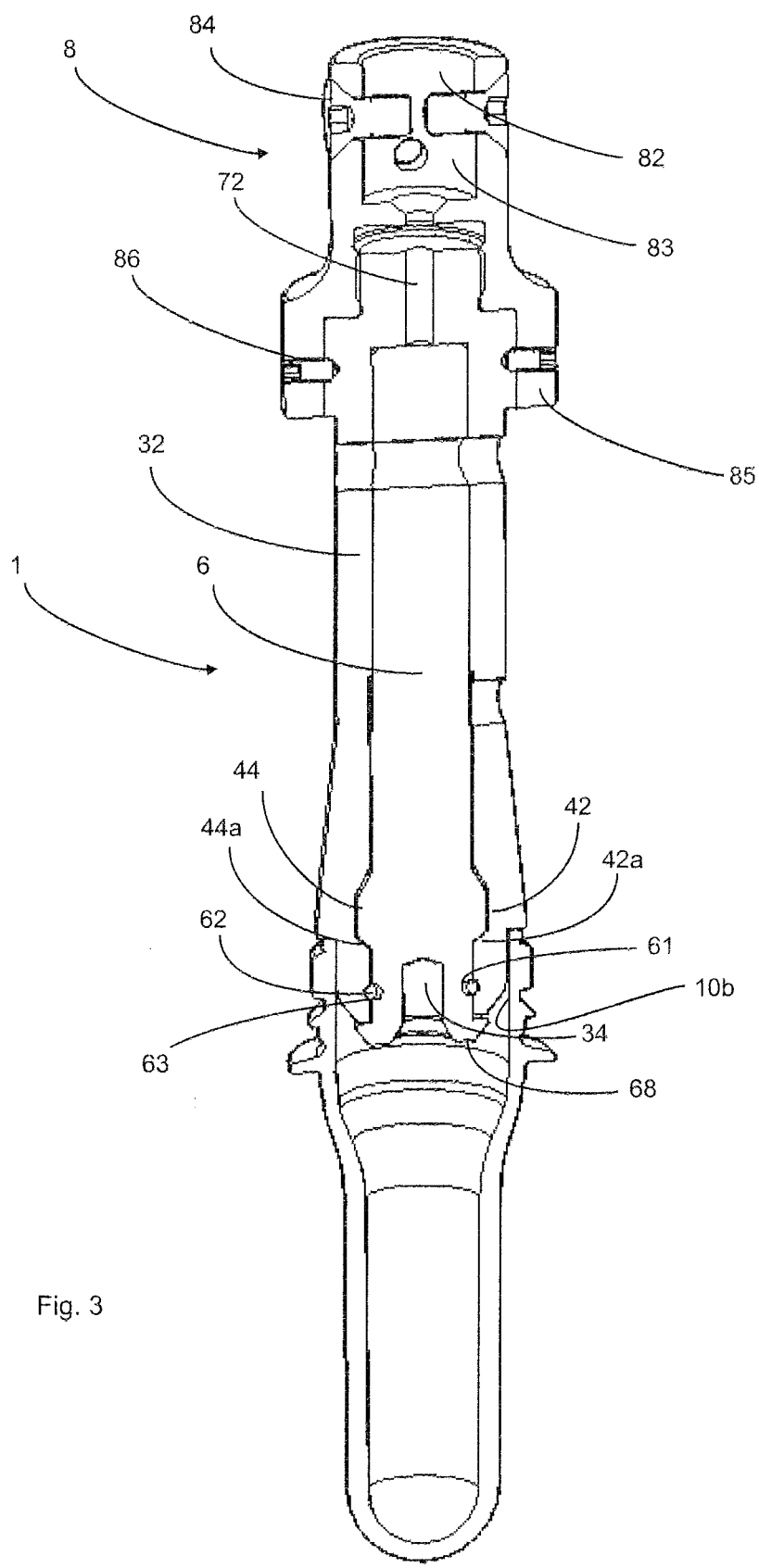
FIG. 3 shows a sectional representation of the holding device shown in FIG. 1 with a plastic parison.

Thus for example it is known that the plastic parisons are guided past infrared heating elements and thus are heated. More recently, however, microwave heating devices have become known inside which the plastic parisons are heated by microwaves. In this case the plastic parisons are usually transported separately and are held by means of holding devices. Various holding devices, such as for example gripping clamps which grip the plastic parisons at their mouths, are known from the prior art. In addition, however, holding elements, such as holding mandrels, which engage in the mouths of the plastic parisons and thus hold them are also known from the prior art.

However, such holding elements do sometimes have the disadvantage that the plastic parisons are not held stably and permanently. Furthermore it would be desirable to provide a holding element which can also be adapted to different diameters of the mouths of the plastic containers.

The object of the present invention therefore is in particular to increase the range of application of such holding devices. This is achieved according to the invention by a holding device according to the independent claim. Advantageous embodiments and modifications are the subject of the subordinate claims.

A holding device according to the invention for holding plastic containers and in particular plastic parisons has a holding section which can be introduced into a mouth of the plastic containers to be held. In this case the holding section has at least one first holding element and at least one second holding element which are movable relative to one another and which have at least one section which can be applied to an inner wall of the mouth.

According to the invention an expansion body is disposed between the holding elements, supports the two retaining elements at least intermittently and preferably spreads them apart, a replaceable expansion element being provided on this expansion body, wherein this expansion element is located at least in part between the expansion body and the holding elements. In this case it would be possible that the expansion body supports the holding elements only in a holding state in the containers, wherein preferably in this state the expansion body determines by means of the expansion element how close the holding elements can be pressed together.

In particular the expansion element is located in a direction of the holding arrangement which is radial with respect to the longitudinal direction between the expansion body, in particular an outer wall of the expansion body, and the holding elements, in particular an inner wall of the holding elements. Thus the expansion element can extend in a circumferential direction around the expansion body and the cross-section of this expansion element, as mentioned, can be disposed between the expansion body and the holding elements.

It is therefore proposed within the scope of the invention to use not only the holding elements which are known in the prior art and automatically spread apart, but also the said expansion body which serves in particular to force the holding elements apart. In this case the expansion element itself is mounted on the expansion body so as to be replaceable, so that by a replacement of this expansion element an adaptation to different mouth geometries of different plastic parisons can be carried out in order thereafter also to change the holding or clamping force. However, an adaptation to different mouth geometries or the setting of the holding or clamping force can also be performed directly by means of a change of expansion body per se.

In a further advantageous embodiment a slot is formed between at least two holding elements. By the provision of this slot these holding elements are at least partially or to a certain extent movable relative to one another. This slot advantageously extends parallel to the longitudinal direction of the entire holding device. This longitudinal direction of the holding device advantageously also extends parallel to a longitudinal direction of the plastic container held by this holding device.

In a further advantageous embodiment the holding section has at least three, preferably at least four and particularly preferably at least five such holding elements or holding sections.

In this case the above-mentioned slots are formed in each case between these holding elements. In this way a very high adaptability of the holding section and thus of the entire holding device is achieved.

In a further advantageous embodiment the holding elements do not protrude completely into the container but in the case of a container disposed on the holding device at least one section of the holding element is also still located outside the container. These holding elements are preferably disposed on a basic body and preferably on a common basic body. In this case this basic body also does not protrude into the container. The holding elements are preferably formed in one piece with this basic body. The holding elements preferably have a bar-shaped configuration. The basic body in turn preferably has a cavity and/or a substantially cylindrical configuration. In an assembled state a section of the expansion body can be located in this cavity.

The above-mentioned slots preferably end between the holding elements on the basic body. In this case it is possible that the slots do not end immediately on the basic body but that openings adjoin the slots, such as for instance circular or oval openings into which these slots merge. Also in this way material stresses can be reduced by forces acting on the holding elements.

In a further advantageous embodiment the holding elements have a curved surface when viewed in a plane perpendicular to the longitudinal direction of the holding device. To this end this curvature can be adapted to a curvature of the inner wall of the plastic containers or the mouth section thereof.

The expansion body is advantageously movable in a longitudinal direction of the holding device relative to the holding section. In this case for example the replacement of the expansion body and of the expansion element can be achieved by this movability. Thus for example the expansion body can be pushed out in the longitudinal direction of the holding device out of a region between the holding elements and in this way the region of the expansion body on which the expansion element is disposed can be made accessible, so that the expansion element can be exchanged.

Advantageously the holding device has at least one locking element which locks the expansion body in a predetermined position (with regard to the longitudinal direction of the holding arrangement) relative to the holding elements. Advantageously the expansion body is also fixed by the holding elements in the longitudinal direction of the holding device.

In a further advantageous embodiment the expansion element is formed as an annular body. The expansion element is advantageously formed as an elastic body. Thus the expansion element may particularly preferably be an O ring. This O ring can be replaced by a different O ring with another cross-section or geometry in order thereby to change the spreading effect or the clamping force or holding force of the entire holding element. The expansion element is advantageously a flexible expansion element.

In a further advantageous embodiment at least one holding element or the spreading body is made of a non-metallic material. Preferably both the expansion body and also the holding elements are made of a non-metallic material.

In the prior art such holding elements are usually made of metal. As mentioned, in the prior art it is usual to heat the plastic parisons by means of infrared radiation. However, recently there has been a transition to the use of microwave ovens instead of infrared ovens. The advantageous non-metallic configuration described here of at least one holding element and preferably of both holding elements and/or of the expansion body offers the advantage that the holding element can also be used in microwave ovens.

In the heating of a preform (plastic parison) by means of microwaves the metallic materials which are exposed to the microwaves would heat up very quickly and therefore functioning thereof would be impaired or this functioning could not be provided. In the embodiment proposed here a holding element is provided for transporting plastic containers or plastic parisons which are heated by microwaves. The holding element is therefore designed so that it is made of materials which absorb very few or even no microwaves. In addition—as mentioned above—the holding force or the clamping force of the gripper on the plastic parisons can be set precisely by the replacement of the O ring or of the expansion body, which are likewise preferably made of a non-metallic material.

The gripping function is fulfilled by the use of non-metallic materials and at the same time the microwave process is not affected. Both the expansion body and also the holding elements are preferably made of a non-metallic material.

In a further advantageous embodiment the material of the holding elements and/or of the expansion body is selected from a group of materials which includes plastics, ceramic and porcelain. The material of the holding elements and/or of the expansion body is selected from a group of materials which includes PEI (polyetherimide), PTFE (polytetrafluorethylene), PP (polypropylene) and the like. However, in each of these cases the material is not metallic and therefore is not heated excessively by microwaves.

The holding device is preferably variable in its holding force due to the respective expansion elements. For changing of the holding force the expansion body can be pressed out of the region surrounded by the holding elements, which preferably takes place through a hole located above the expansion body. Then the expansion element can be removed from the expansion body and replaced by another expansion element. In a further stage the expansion body with the new expansion element can be pressed in again into the space surrounded by the holding elements.

In this case the expansion body can preferably be centred and also held by means of groove/projection joints. More precisely, a projection from the expansion body described in more detail below can engage in a groove of a holding element and thus no additional screwing or fixing of the expansion body within the holding elements is necessary. The expansion body preferably has a pin-shaped configuration. The expansion body preferably has, at least in some sections, a constant cross-section in the longitudinal direction of the holding device.

The holding elements together preferably form a cavity which is suitable to receive at least one section of the expansion body and also serves for this purpose.

In a further advantageous embodiment the expansion body has a groove into which the expansion element can be laid. This groove is advantageously annular and extends continuously in a predetermined section of the height of the expansion body. The groove is preferably designed in such a way that it receives only a region of the expansion element, so that the expansion element protrudes out of this groove in a radial direction of the expansion body. Thus this groove serves primarily for fixing the position of the expansion element, in particular in the longitudinal direction of the holding device.

In a further advantageous embodiment at least one holding element has a groove to receive at least one section of the expansion element. Several of the holding elements preferably have a corresponding groove to receive the section of the expansion element. In this case the expansion element can be laid in this groove, so that it is held autonomously in this groove. Furthermore it would also be possible for an overall more or less circumferential channel to be produced by the individual grooves in the holding elements.

In a further advantageous embodiment the groove on the holding elements is located on an inner face of the holding elements, i.e. on an inner face which is facing the expansion body.

In a further advantageous embodiment the expansion body has a stop element which in an assembled state bears against an end portion of at least one holding element. In this way the position of the expansion body relative to the holding elements can be fixed or more precisely defined.

In a further advantageous embodiment the holding device has a main body on which the holding elements are at least indirectly fastened. In this case the holding elements themselves can again be disposed on a central part, in particular the above-mentioned basic body, and can preferably be formed in one piece with this basic body. This basic body in turn can be fastened on the main body, for example screwed on the main body. In this case it is possible that this basic body, on which the holding section or the holding elements are disposed, is inserted into a receiving opening of the main body.

In a further advantageous embodiment the main body has an opening through which a tool can be introduced into the interior of the basic body in the longitudinal direction of the holding device. By the introduction of this tool, for example a screwdriver, it is possible to press the expansion body out of a grip formed by the holding elements by applying a corresponding pressure to the basic body in the longitudinal direction of the holding device. This pressing out can take place in order to replace the expansion element.

In a normal state the expansion body is also advantageously fixed by a resilient force of the individual holding elements. This spring force of the holding elements can be overcome by the introduction of a tool through the opening and the pressing out of the expansion body. In a further advantageous embodiment the expansion body has a projection extending at least partially in the circumferential direction of the expansion body. This projection can cooperate with a groove in the individual holding elements in order thus to fix the expansion body in the longitudinal direction of the holding device relative to the holding elements. Conversely a projection which engages in a corresponding groove in the fixing body could also be disposed on the holding elements.

In this case at least the projection and/or the groove advantageously has an inclined surface, i.e. in particular an inclined surface relative to a horizontal plane, if the longitudinal direction of the holding device extends vertically. When the expansion body is pressed out of the holding elements or the basic body, this inclined surface can serve to force the holding elements apart and thus to release the expansion body. Due to the configuration of this inclined surface, in particular the inclination thereof, it is also possible to influence the force which is necessary in order to press out the expansion body from the basic body. Both the projection and also the groove preferably have a corresponding inclined surface.

Therefore at least one holding element advantageously has a recess in which the projection engages. In this case a cross-section of this recess is advantageously formed in such a way that it is suitable to receive the projection and preferably also to receive the projection by positive engagement.

In this way the expansion body can be locked relative to the holding element even without the use of screw connections.

In a further advantageous embodiment the holding section forms a stop which is suitable to bear against a rim of the mouth of the plastic containers. Therefore this stop preferably has a greater cross-section than the mouth of the containers. In this way the holding section can be introduced into the mouth of the plastic parisons precisely to a specific extent. In this case the holding elements themselves in each case form a segment of this stop.

Such a stop can advantageously be formed on each of the holding elements. As a whole a stop can be produced in this way which is annular overall (and irrespective of the gaps).

In a further advantageous embodiment, in an assembled state the expansion body protrudes in a longitudinal direction of the holding device beyond the holding elements.

Thus for example the expansion body can have a stop which prevents the expansion body from being pushed in too far into the holding elements.

Furthermore, the present invention relates to a device for heating plastic parisons with a transport device which transports the plastic parisons along a predetermined transport path and a heating device which heats the plastic parisons at least intermittently during transport thereof. According to the invention at least one holding device for holding the plastic parisons of the type described above is disposed on the transport device. A plurality of such holding devices is preferably disposed on the transport device.

In a further advantageous embodiment the transport device has a transport wheel on which the holding devices are disposed. Advantageously at least one heating device is a heating device which applies microwaves to the plastic parisons in order to heat them. In this embodiment the heating device preferably has at least one microwave resonator into which the plastic parisons can be introduced. In this case at least sections of the holding device are preferably also introduced into this resonator. Furthermore in this case the heating device can also have a microwave generating device such as for instance a magnetron.

In a further preferred embodiment the device can also have a linear movement unit which introduces the plastic parisons—in particular by a movement in the longitudinal direction thereof—into microwave resonators.

In a further preferred embodiment at least one heating device is movable with the plastic parisons, i.e. the plastic parisons are preferably transported together with the heating devices.

Furthermore, however, it would also be possible for the heating device to be an infrared heating device. In this case the infrared heating device is preferably disposed stationary relative to the transport path of the plastic parisons. In this embodiment the plastic parisons with their holding devices are preferably guided past the heating devices. In this embodiment the holding devices are preferably disposed on a transport chain.

FIG. 1 shows a perspective representation of a holding device 1 according to the invention. In this case this holding device 1 has a holding section 2 which can be introduced at least partially into a container or into the mouth of a container.

For this purpose the holding section has five holding elements 22, 24, 26 (the others are not shown, since they are at the back) which in each case have a radially inwardly offset end section 22a, 24a, 26a which can be introduced into the mouths of the plastic parisons. In this case slots 25, through which a certain relative movement of the holding elements relative to one another is possible, are disposed respectively between the individual holding elements. In this way the holding elements 22, 24 can be brought slightly closer to one another on entering the plastic parison. These slots preferably extend in a straight line and are particularly preferably parallel to the longitudinal direction L of the holding device. Thus the circumferential direction of the holding device mentioned in the introduction is defined as the circumferential direction around the longitudinal direction.

The reference numeral 68 designates a stop of the expansion body (not shown in FIG. 1) which extends between the individual holding elements or inside them. The reference numeral 32 designates a basic body of the holding section on which the holding elements 22, 24, 26 are disposed and with which the holding elements 22, 24, 26 are formed in one piece.

These holding elements are preferably disposed at least slightly flexibly on the basic body 32. Due to this flexible arrangement the holding elements are pressed slightly inwards as they penetrate into a plastic container and then apply a certain opposing force against the inner wall of the mouth which holds the plastic containers 10 on the holding device 1.

The reference numeral 8 designates a main body or support of the holding device 1, on which in turn the holding section 2, more precisely the basic body 32, is disposed. In the interior the basic body 32 forms a cavity in which in turn the expansion body is disposed. The basic body 2 is disposed in the main body 8 by means of screw connections 86. In this case the reference numeral 85 relates to a receiving region into which the holding section, more precisely the basic body 32, is introduced.

The reference numeral 88 designates a support surface in order to mount the holding device 1 on a support. At least the section 32 and the holding elements 24, 26 and 22 are preferably made of a non-metallic material. Advantageously the expansion body located in the interior (not visible) is also made of a non-metallic material.

FIG. 2 shows a representation of the holding arrangement 1 with a plastic parison 10 disposed thereon. This plastic parison 10 has a mouth into which the end section 2 of the holding device penetrates in order to hold this plastic parison.

FIG. 3 shows a sectional representation of the holding device 1 according to the invention. In this case two holding elements 22 and 26 can again be seen. It will be recognised that the expansion body 6 is disposed inside the holding elements, wherein the reference numeral 62 relates to the expansion element which defines how far, with the expansion body inserted, the two holding elements 26 and 22, but collectively all the holding elements, are pressed apart and are pressed against the inner wall 10b of the plastic parison. The reference numeral 63 identifies a receiving groove of the holding element 22 against which the expansion element 62 bears.

In this connection it is pointed out that the expansion body must not spread the holding elements 22, 24, 26 too wide in the operational state. Accordingly the expansion body could also be designated as a support body which supports the holding elements radially inwards. However, when the expansion body is removed from the basic body the holding elements are likewise at least slightly spread apart.

The reference numeral 68 again designates the lower stop which bears against the holding elements 22, 24, 26.

The reference numeral 86 again relates to screw devices, such as in this case grub screws, by which the support 8 is fastened to the basic body 32 and thus also to the holding section 2. The reference numeral 72 identifies a channel-shaped opening through which a tool such as for example a small screwdriver can be introduced in order to press an expansion body 6 downwards in the longitudinal direction L and out of the body 32. In this way the expansion element 62 is accessible and can be replaced.

With the screw bodies 84 the entire device can be fastened to a further element, such as for example a rod-like body, which enters into the recess 83.

Thus for example the holding device can be fastened to a drive which also causes the plastic parison 10 to turn about its own longitudinal axis. However, the holding device can also be disposed on a transport device such as for instance a transport chain and can be transported thereby.

The reference numeral 44 relates to a circumferential projection which is formed on the expansion body 6. In a fitted state this projection engages in grooves or recesses 42 which are formed in the individual holding elements. In this case it will be seen that the geometric configurations of these projections and recesses are adapted to one another. Towards the bottom, i.e. in the direction of the projection, both the groove and also the projection each have oblique surfaces 42a, 44a. If the expansion body is to be pressed out of the basic body 32 or the holding elements, a force is exerted by these oblique surfaces on the holding elements and spreads these apart.

Furthermore it will be recognised that the expansion element 62 is located relatively close to the lower end of the holding device, so that with the plastic parison positioned said element is likewise disposed inside this plastic parison. This expansion element is preferably disposed in the longitudinal direction below the projection 44 and preferably between the projection and the stop element 68. This is advantageous since in this case the force to be applied by the expansion element on the holding elements is less than in the case of a higher arrangement of the expansion element 62.

Also in this way a change of the expansion element 62 is made easier, since the expansion body 6 does not have to be pushed so far out of the region surrounded by the holding elements. The reference numeral 82 identifies an opening disposed in the main body through which a tool can be introduced for pressing the expansion body 6 out of the basic body 32. The reference numeral 61 designates a circumferential groove which is disposed on the expansion body and into which the expansion element 62 can be laid. Also the expansion element could be designated according to its function as a support element which serves for supporting the holding elements relative to the expansion body, in particular if the holding device is inserted into a plastic parison.

Figure 4:
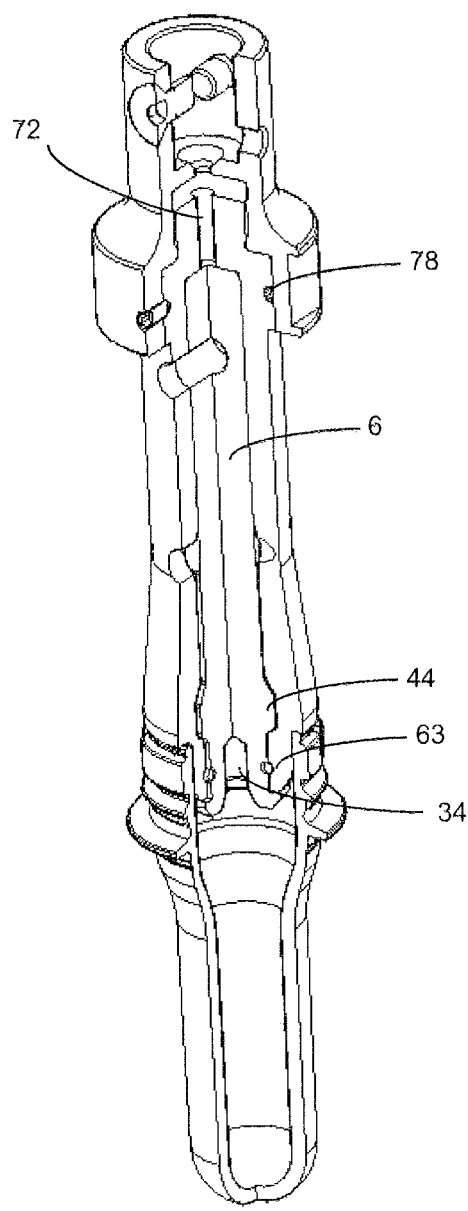
FIG. 4 shows a further sectional representation of the holding device shown in FIG. 1 with a plastic parison.

FIG. 4 shows a further representation of the holding device according to the invention. Here too the channel 72 is again discernible which serves for releasing the expansion body from the supports or the basic body 32. In operation, the entire holding device can be delivered to the plastic parison and can penetrate into the mouth 10a thereof. As soon as this has taken place, the plastic parison is also gripped in a stable manner on the holding device. However, a further penetration—as mentioned above—is prevented by the stop 68.

The reference numerals 22 a relate to the bearing surfaces with which the holding elements bear against the inner wall 10 b of the plastic parison. The reference numeral 78 designates a groove which is disposed in the expansion body and in which the screw body 86 can engage in order to fix the expansion body. The reference numeral 34 designates a cavity disposed in the expansion body.

Figure 5:
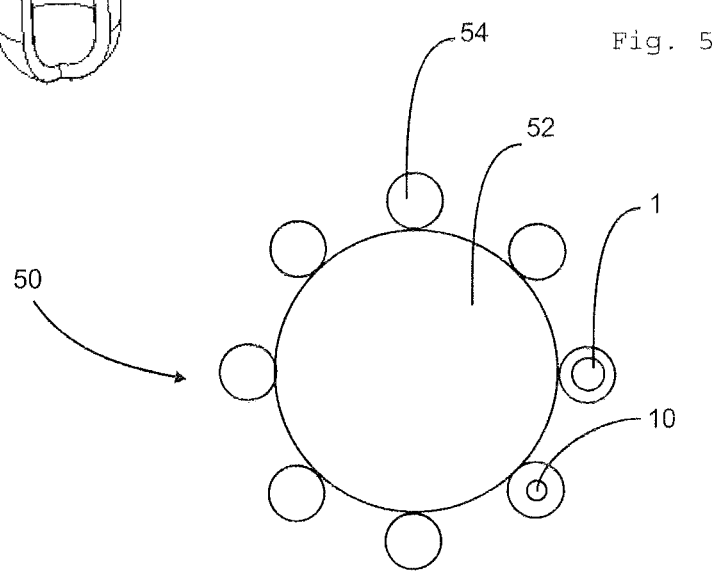
FIG. 5 shows a broadly schematic representation of a heater for heating plastic parisons.

FIG. 5 shows a broadly schematic representation of a heater 50 for heating plastic parisons 10. This heater 50 has a rotatable support 52 on which a plurality of heating devices 54 are disposed. These heating devices are in this case microwave units which in each case have a resonator into which the plastic parisons 10 are introduced for heating thereof. Thus in this case the heating devices 54 are transported together with the plastic parisons.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

What is claimed is:

1. Holding device for holding plastic containers and in particular plastic parisons with a holding section which can be introduced into a mouth of the plastic containers, wherein the holding section has at least one first holding element and one second holding element which are movable relative to one another and which in each case have a section which can be applied to an inner wall of the mouth, wherein an expansion body which supports the two holding elements at least intermittently is disposed between the holding elements, wherein a replaceable expansion element is disposed on this expansion body, wherein this expansion element is located at least in some sections between the expansion body and the holding elements, wherein the expansion body is movable in a longitudinal direction of the holding device relative to the holding section.

2. Holding device according to claim 1, wherein the replaceable expansion element is designed as an annular body.

3. Holding device according to claim 1, wherein at least the holding elements or the expansion body is made of a non-metallic material.

4. Holding device according to claim 1, wherein a material of the holding elements and/or of the expansion body is selected from a group of materials which includes plastics, ceramic and porcelain.

5. Holding device according to claim 1, wherein a material of the holding elements and/or of the expansion body is selected from a group of materials which includes PEI (polyetherimide), PTFE (polytetrafluorethylene), PP (polypropylene) and the like.

6. Holding device according to claim 1, wherein at least one holding element has a groove to receive at least one section of the expansion element.

7. Holding device according to claim 1, wherein the expansion body has a groove into which the expansion element can be laid.

8. Holding device according to claim 1, wherein the expansion body has a stop element which in an assembled state bears against an end section of at least one holding element.

9. Holding device according to claim 1, wherein the holding device has a main body on which the holding elements are disposed.

10. Holding device according to claim 9, wherein the main body has an opening through which a tool can be introduced into the interior of the main body in the longitudinal direction of the holding device.

11. Holding device according to claim 1, wherein the expansion body has a projection extending at least partially in the circumferential direction of the expansion body.

12. Holding device according to claim 11, wherein at least one holding element has a recess in which the projection engages.

13. Holding device according to claim 1, wherein the holding section forms a stop which is suitable for bearing against a rim of the mouth of the plastic containers.

14. Device for heating plastic parisons with a transport device which transports the plastic parisons along a predetermined transport path and a heating device which heats the plastic parisons at least intermittently during transport thereof, wherein at least one holding device for holding the plastic parisons according to at least one of the preceding claims is disposed on the transport device.

15. Holding device according to claim 1, wherein a slot is formed between at least two holding elements.

16. Holding device according to claim 15, wherein the slot extends parallel to the longitudinal direction of the entire holding device.

17. Holding device according to claim 1, wherein the holding elements do not protrude completely into the container but in a case of a container disposed on the holding device at least one section of the holding element is still located outside the container.

18. Holding device according to claim 1, wherein the holding device has at least one locking element which locks the expansion body in a predetermined position relative to the holding elements.

* * * * *